UNITED STATES PATENT OFFICE.

JOHN LUCAS AND WILLIAM H. LUCAS, OF PHILADELPHIA, PENNSYLVANIA.

IMPROVED COMPOSITION FOR PUTTY.

Specification forming part of Letters Patent No. 57,528, dated August 28, 1866.

*To all whom it may concern:*

Be it known that we, JOHN LUCAS and WILLIAM H. LUCAS, of the city and county of Philadelphia, and State of Pennsylvania, have invented or discovered a new and useful Improvement in the Composition of Putty; and we do hereby declare that the following is a full and exact description thereof.

The nature of our invention or discovery consists in the composition of ground marble in equal proportion with whiting, with an addition of linseed-oil of requisite proportion to form a superior putty. Although we usually adopt this proportion, yet we do not confine ourselves to it, as other proportions will answer the purpose.

To enable others skilled in the art to which our improvement appertains to make and use our composition, we will give a description of the process which we adopt.

We grind up the fragments or refuse of marble obtained from marble yards and quarries to an impalpable powder, and mix therewith an equal proportion of whiting, and add thereto linseed-oil in such quantity as is necessary to give the compound the proper consistency in the manner usually adopted in the arts, and mix the whole together thoroughly to form a superior putty.

Having thus described our invention or discovery in the composition of putty, what we claim therein as new, and desire to secure by Letters Patent, is—

The composition of ground marble, whiting, and linseed-oil to form a superior putty, substantially in the manner hereinbefore described.

In testimony that the above is our invention we have hereunto set our hands and affixed our seals this 15th day of June, 1866.

JOHN LUCAS. [L. S.]
WM. H. LUCAS. [L. S.]

Witnesses:
STEPHEN USTICK,
JOHN WHITE.